United States Patent
Yajima

(10) Patent No.: US 12,183,171 B2
(45) Date of Patent: Dec. 31, 2024

(54) SHOPPING BAG, PRODUCT SETTLEMENT SYSTEM, PRODUCT SETTLEMENT METHOD, AND PROGRAM

(71) Applicant: FAST RETAILING CO., LTD., Yamaguchi (JP)

(72) Inventor: Muneharu Yajima, Yamaguchi (JP)

(73) Assignee: FAST RETAILING CO., LTD., Yamaguchi (JP)

( * ) Notice: Subject to any disclaimer, the term of this patent is extended or adjusted under 35 U.S.C. 154(b) by 0 days.

(21) Appl. No.: 18/508,400

(22) Filed: Nov. 14, 2023

(65) Prior Publication Data
US 2024/0169811 A1 May 23, 2024

(30) Foreign Application Priority Data
Nov. 18, 2022 (JP) .................................. 2022-185100

(51) Int. Cl.
G06Q 20/00 (2012.01)
G06Q 20/32 (2012.01)
G06Q 30/06 (2023.01)
G07G 1/00 (2006.01)
H01Q 1/22 (2006.01)

(52) U.S. Cl.
CPC .......... G07G 1/009 (2013.01); G06Q 20/3278 (2013.01); G06Q 30/06 (2013.01); H01Q 1/22 (2013.01)

(58) Field of Classification Search
CPC .... G07G 1/009; G06Q 20/3278; G06Q 30/06; H01Q 1/22
USPC ..................................................... 235/472.02
See application file for complete search history.

(56) References Cited

U.S. PATENT DOCUMENTS

2013/0126611 A1* 5/2013 Kangas .............. G06K 7/10178
235/385
2021/0174417 A1 6/2021 Kawamoto

FOREIGN PATENT DOCUMENTS

JP 2019-215719 A 12/2019
JP 2021-092948 A 6/2021

* cited by examiner

Primary Examiner — Daniel A Hess
(74) Attorney, Agent, or Firm — Carter, DeLuca & Farrell LLP

(57) ABSTRACT

Provided is a shopping bag including a perimeter wall having a shield layer having a radio wave shielding function, and an antenna layer having a wire antenna for scanning product identification information from an RF tag attached to a product accommodated in a housing space being stretched along the perimeter wall.

13 Claims, 10 Drawing Sheets

SHOPPING BAG, PRODUCT SETTLEMENT SYSTEM, PRODUCT SETTLEMENT METHOD, AND PROGRAM

BACKGROUND

In recent years, a store system in which, when a consumer purchases a product at a selling area of a store or the like, the consumer registers the sale of the product to be purchased by the consumer himself or herself by using a communication terminal such as a smartphone owned by an individual, and thus, a time required for payment processing by an accounting machine thereafter is shorten has been developed. For example, JP 2021-092948 A discloses a technology in which a communication terminal such as a smartphone owned by a customer is used as a shopping assistance device by installing a dedicated program (application software). The shopping assistance device scans a barcode attached to a product, acquires information of the product based on information of the barcode, and generates an accounting barcode associated with accounting information regarding the product to be purchased. Then, the accounting barcode is scanned with the accounting machine in the store, and thus, it is possible to quickly proceed to payment processing.

In addition, a technology in which an RF tag attached to a product put in a shopping bag is scanned by a shopping bag including a radio frequency identification (RFID) reader to specify the product to be purchased before a customer performs settlement has also been developed. For example, JP 2019-215719 A discloses a technology in which a settlement assistance terminal including an RFID antenna and a wireless network communication unit is put in an inner pocket of a shopping bag (having a radio wave shielding function), and the wireless communication unit monitors radio wave intensity related to wireless communication from an outside of the bag, and switches between scanning of an RF tag attached to a product and transmission of the scanned product information in accordance with a magnitude of the radio wave intensity.

SUMMARY

According to some embodiments of the present invention, provided is a shopping bag with a housing space that can accommodate products by a perimeter wall having a layered structure. The perimeter wall includes at least a shield layer having a radio wave shielding function, and an antenna layer disposed inside the shield layer, a wire antenna for scanning product identification information from an RF tag attached to a product accommodated in the housing space being stretched along the perimeter wall in the antenna layer.

Further features of the present disclosure will become apparent from the following description of exemplary embodiments (with reference to the attached drawings).

DESCRIPTION OF THE EMBODIMENTS

Figure 1A:
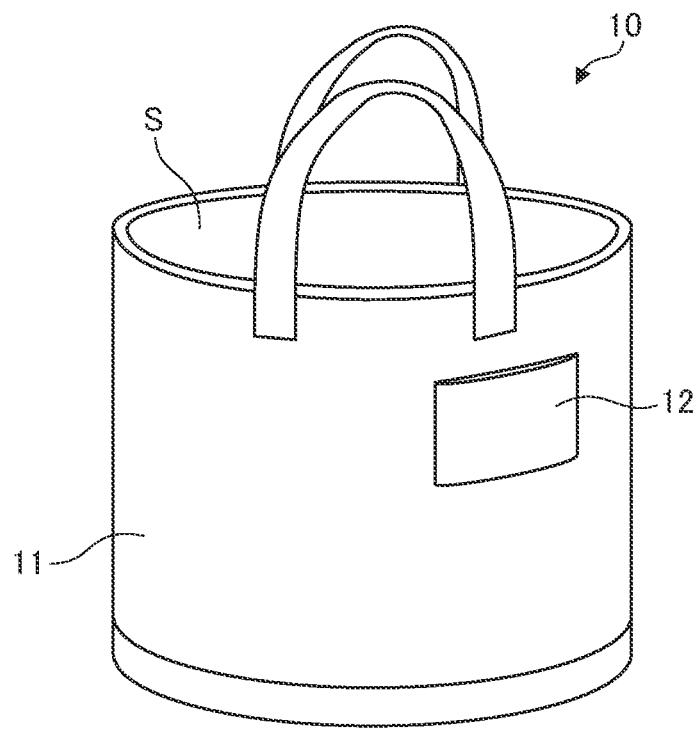
FIG. 1A is a perspective view of a shopping bag, showing an appearance of the shopping bag in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

While the embodiment of the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

<Shopping Bag>

Figure 1B:
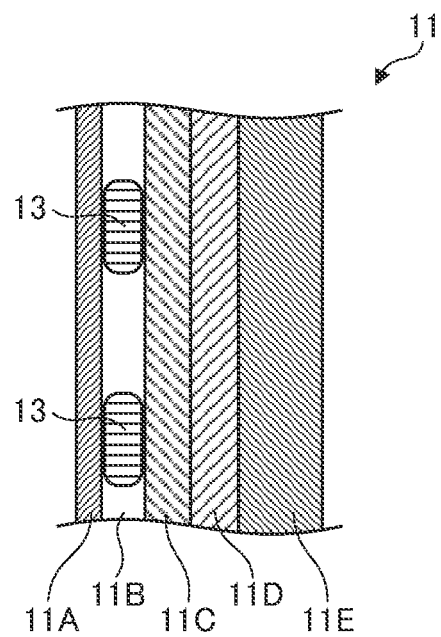
FIG. 1B is a schematic diagram schematically showing a cross-section of a peripheral wall part of the shopping bag in the embodiment.

FIGS. 1A and 1B show a shopping bag 10 according to an embodiment of the present invention. As shown in FIG. 1A, in the shopping bag 10, a housing space S whose upper portion is opened is formed by a perimeter wall 11 and a bottom surface, and a product or the like purchased by a user can be accommodated in the housing space S. A height of the perimeter wall 11 is denoted by h, a depth of the bottom surface is denoted by d, and a width of the bottom surface is denoted by w.

FIG. 1B is a schematic diagram schematically showing a cross-section of the perimeter wall 11 of the shopping bag 10. As shown in the drawing, the perimeter wall 11 has a multilayer structure, and includes a protective layer 11A, an antenna layer 11B, an insulating layer 11C, a shield layer 11D, and a surface layer 11E in order from an inner side (side close to the housing space S).

The protective layer 11A is a layer for protecting a wire antenna 13 of the antenna layer 11B to be described later, and suppresses damage or disconnection of the wire antenna 13 due to concentration of stress on the wire antenna 13 and separation of the wire antenna 13 from the layer to which the wire antenna 13 is fixed when a product or the like taken in and out of the housing space S is caught by the wire antenna. Any material can be adopted as the protective layer 11A as long as the material can appropriately protect the wire antenna 13 with appropriate flexibility and elasticity and can easily transmit radio waves in an UHF band to the housing space S by the wire antenna 13 to be described later. For example, a resin material such as PVC, EVA, or TPU, which is a non-metal other than rubber, can be adopted as the protective layer 11A.

The antenna layer 11B is a layer in which the wire antenna 13 is stretched. The wire antenna 13 is formed by using a wire made of a thin wire shaped conductive wire as an antenna, and radiates radio waves concentrically in a length direction. It is preferable that copper, iron, aluminum, other metals, or the like is used as the conductive wire, an insulator of foamed polyethylene is disposed outside the conductive wire, and a non-rubber-based material such as a black polyolefin coating is disposed as an outer coating (sheath). In the case of a coaxial antenna to be described later, a conductive wire made of copper or the like, an insulator made of foamed polyethylene or the like, a metal laminate tape made of copper or the like, and a polyolefin coating as a sheath are provided in order from a center, and a termination resistor (terminator) connecting a central conductive wire and a metal laminate tape is disposed at an end opposite to the antenna terminal.

Figure 2A:
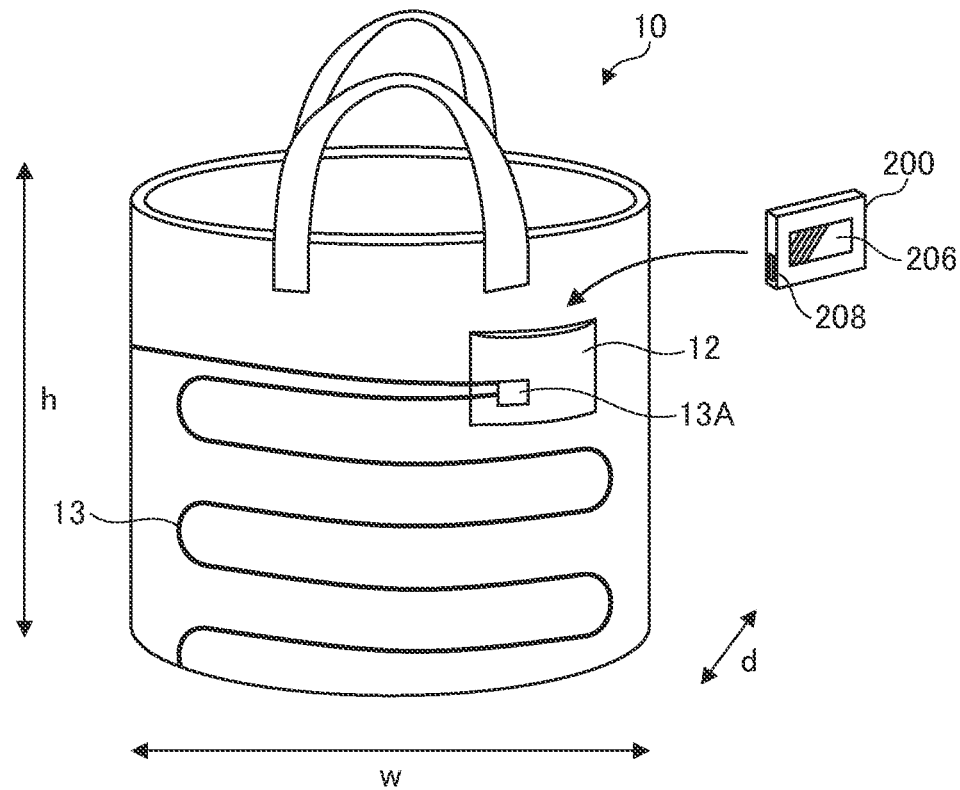
FIG. 2A is a diagram of a wire antenna placed in the antenna layer of the shopping bag.
Figure 2B:
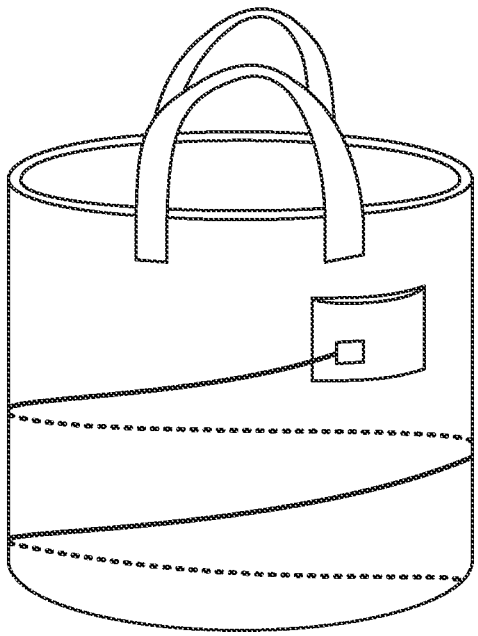
FIGS. 2B and 2C are diagrams showing variations of the wire antenna.
Figure 2C:
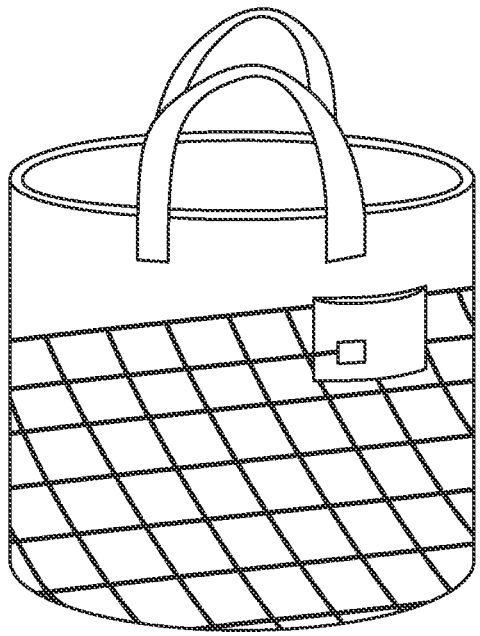

For example, as shown in FIG. 2A, the wire antenna 13 can be stretched in a meander shape alternately bent in a lateral direction and a longitudinal direction along a shape of the shopping bag 10. The wire antenna 13 is formed in an annular shape, and both end portions thereof penetrate the insulating layer 11C, the shield layer 11D, and the surface layer 11E, which are layers outside the antenna layer 11B, and are exposed and accommodated in an outer pocket 12 provided in the surface layer 11E, and an antenna terminal 13A for connection is provided at a distal end. The wire antenna 13 extends from the outer pocket 12 in which the antenna terminal 13A is accommodated in the antenna layer 11B by a certain distance in the lateral direction, extends by a certain distance by being bent downward and being folded back again in the lateral direction, and extends to cover a wide range of the perimeter wall 11 while repeatedly extending by a certain distance by being bent downward and being folded back again in the lateral direction. Although not shown in FIGS. 2A to 2C, the wire antenna 13 that has reached a lowermost portion of the perimeter wall 11 extends to the perimeter wall 11 on an opposite side through a bottom portion of the shopping bag 10, reaches an upper portion of the perimeter wall 11 while being further alternately folded back, and returns to the antenna terminal 13A. As in a modification example shown in FIG. 2B or 2C, the antenna shape may be disposed in a spiral shape or a mesh shape like a loop antenna in addition to the meander shape. As a length of the wire antenna 13 stretched along the perimeter wall 11 is increased, radio waves are radiated to the entire shopping bag 10, the occurrence of null points and shadowing is suppressed, and the accuracy of collective scanning can be expected to be improved. However, a disconnection risk of the antenna and antenna cost increase, and the body of the shopping bag 10 tends to be hard. In addition, since an antenna having a coaxial cable shape (two wires for one cable) (hereinafter, referred to as a coaxial antenna) is used, the wires can be made compact. However, even in a case where the coaxial antenna is compactly disposed in a meander shape, it is preferable that an RF tag of a product or the like accommodated in the shopping bag 10 can be scanned over the entire housing space S by setting a length of the coaxial antenna to be at least three times or more a w direction (width direction) of the shopping bag 10 and disposing the coaxial antenna such that a center of gravity of the wire antenna 13 is on a back bottom side of the center of the body of the shopping bag 10. Three surfaces of four corners of the bottom surface of the housing space S are surrounded by the shield layer, and radio waves tend to be hard to reach. However, the wire antenna 13 is disposed along the perimeter wall 11 as described above, and thus, it is possible to accurately scan the radio waves.

The insulating layer 11C is a layer for electrically insulating the wire antenna 13 of the antenna layer 11B and the shield layer 11D to be described later. The insulating layer 11C is made of an insulating material such as paper, cloth, or a plastic film. In a case where the antenna is coated with an insulating material or the like, the insulating layer 11C may be omitted.

The shield layer 11D is made of a material having a radio wave shielding function, such as a metal foil. The shield layer 11D prevents radio waves emitted from the wire antenna 13 from leaking to an outside of the perimeter wall 11 of the shopping bag 10, and prevents radio waves from the outside of the perimeter wall 11 from being mixed to the housing space S.

The surface layer 11E is an outermost layer of perimeter wall 11, and can be formed of any material such as cloth, paper, leather, synthetic fiber, and resin according to the design of shopping bag 10. As described above, the outer pocket 12 in which the antenna terminal 13A is accommodated is provided at an upper position of the surface layer 11E. As will be described later, the outer pocket 12 is formed such that display by a notification unit 206 of a settlement assistance terminal 200 can be visually recognized from the outside. The outer pocket 12 is made of, for example, a transparent resin material. In addition, in another embodiment, a window portion made of a transparent material can be provided at a position corresponding to the notification unit 206 of the outer pocket 12. In addition, the window portion may not be made of a transparent material and may be a simple opening portion.

The antenna terminal 13A accommodated in the outer pocket 12 is provided to be connected to a terminal 208 of the settlement assistance terminal 200, penetrates through the insulating layer 11C, the shield layer 11D, and the surface layer 11E, and is electrically connected to the wire antenna 13. The settlement assistance terminal 200 is detachably connected to the wire antenna 13 via the antenna terminal 13A and the terminal 208, and is accommodated in the outer pocket 12 similarly to the antenna terminal 13A.

<Hardware Configuration of Settlement Assistance Terminal>

Figure 3:
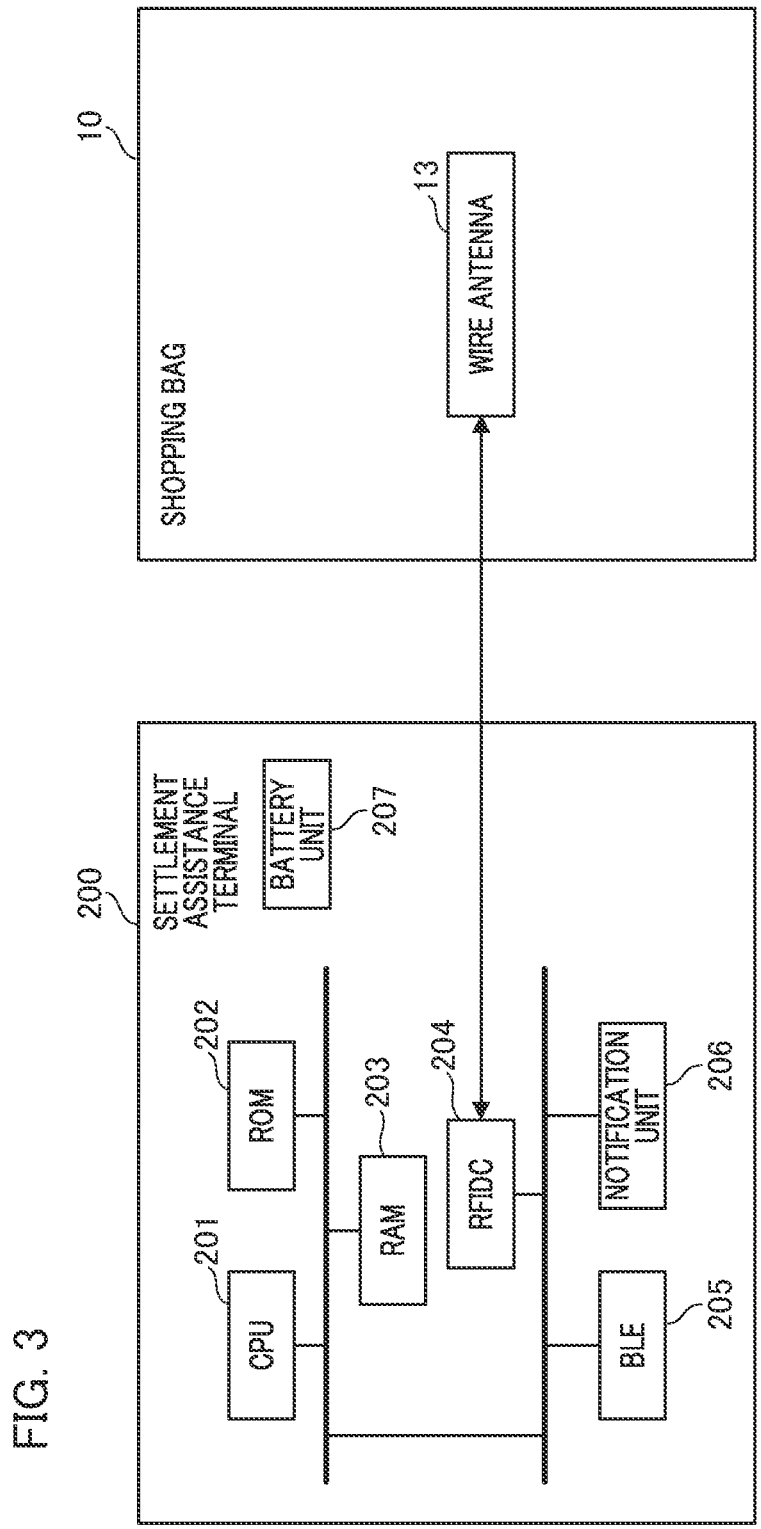
FIG. 3 is a block diagram of the hardware configuration of the settlement support terminal.

FIG. 3 shows a hardware configuration of the settlement assistance terminal 200. The settlement assistance terminal 200 includes a CPU 201, a ROM 202, a RAM 203, a radio frequency identification (RFID) controller 204, a Bluetooth (trademark) low energy (BLE) module 205, a notification unit 206, and a battery unit 207.

The CPU 201 operates based on a program stored in the ROM 202, and controls the units of the settlement assistance terminal 200. That is, the CPU 201 functions as a control unit 211 of the settlement assistance terminal 200. The ROM 202 stores a boot program executed by the CPU 201 at the time of activating the settlement assistance terminal 200, a program depending on the hardware of the settlement assistance terminal 200, and a program for realizing processing on a bag side shown in FIG. 5. The CPU 201 loads the program of the ROM 202 onto the RAM 203, and executes the loaded program. Thus, the CPU 201 realizes functions or processing of the units to be described later.

The RFID controller 204 radiates radio waves by using the connected wire antenna 13 of the shopping bag 10, and scans information from the RF tag present in a radiation range. The RF tag (not shown) is a tag having internally (embedding) a chip (integrated circuit) for recording predetermined identification information and an antenna, and stores, for example, pieces of identification information of individual products, and is fixed to a part of the product with a member called ROX in addition to being attached to a package of the product. When radio waves in a UHF band (860 MHz to 960 MHZ) transmitted from the wire antenna 13 based on an instruction of the RFID controller 204 are received by the antenna in the tag, the RF tag produces an electric current with the radio waves as an energy source and transmits information (electronic product code (EPC)) retained in the chip by radio waves in a similar UHF band. The RFID controller 204 acquires product identification information by receiving the radio waves returned from the RF tag via the wire antenna 13.

The BLE module 205 is an incorporated module for establishing connection of near field communication with a user terminal 30 to be described later.

As will be described later, the notification unit 206 displays information regarding payment of a product put in the shopping bag 10, and is implemented as, for example, a light emitting diode (LED) or a liquid crystal display panel provided on a surface portion of the settlement assistance terminal 200.

The battery unit 207 is a battery (secondary battery such as lithium ion) that provides electric power as a power source of the units such as the CPU 201 and the RFID controller 204 described above.

<Product Settlement System>

Figure 4:
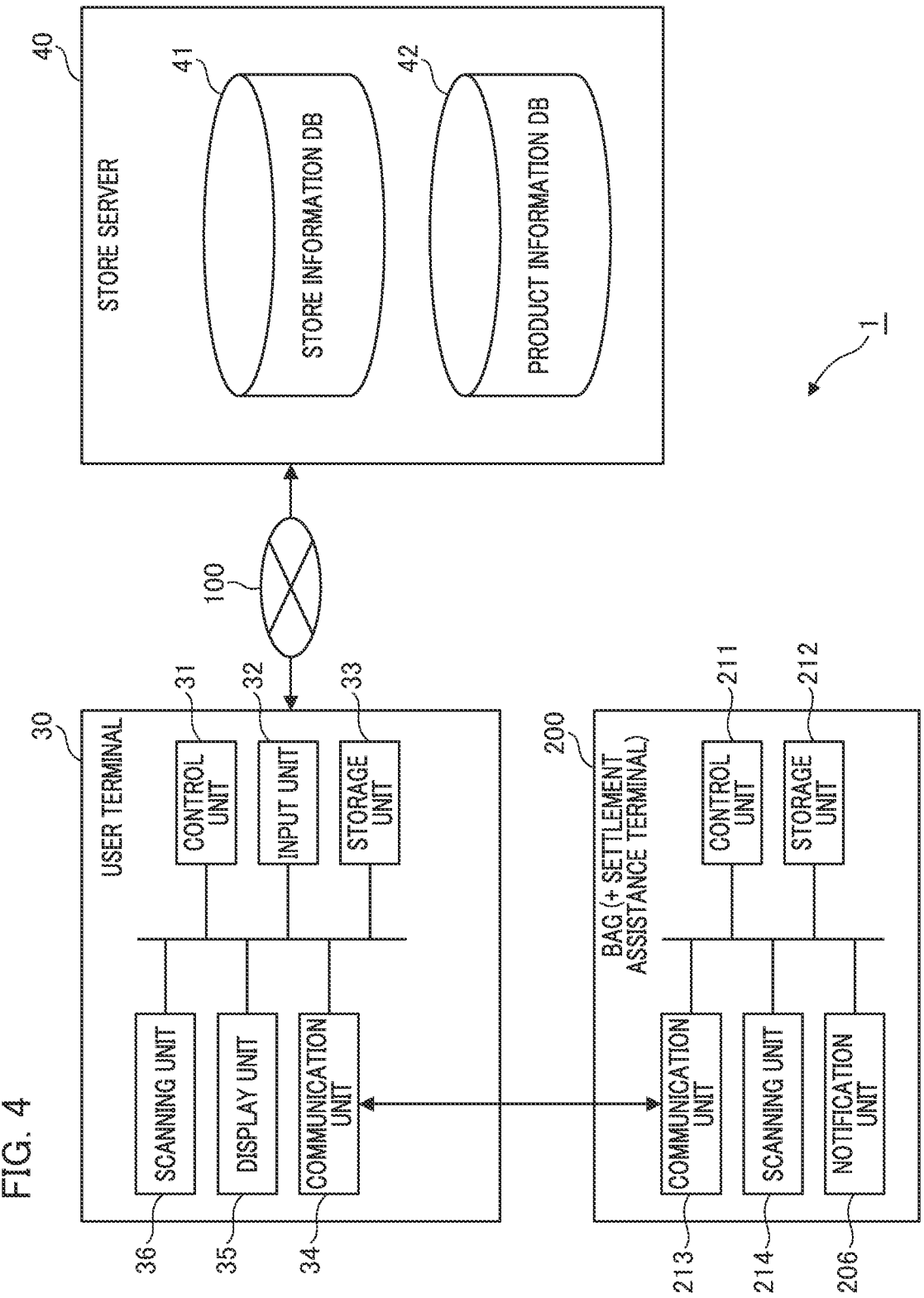
FIG. 4 is a block diagram of a product settlement system.

Next, a configuration example of a product settlement system using the shopping bag 10 and the settlement assistance terminal 200 of the present embodiment will be described. As shown in FIG. 4, a product settlement system 1 includes the settlement assistance terminal 200 electrically connected to the shopping bag 10, the user terminal 30 owned by a customer, and a store server 40. The user terminal 30 and the store server 40 are connected to each other to be able to communicate via a network 100. The network 100 includes, for example, the Internet, a wide area network (WAN), a local area network (LAN), a wireless base station such as WiFi, a provider device, a dedicated line, and the like. The product settlement system 1 is a system that assists settlement of a purchased product by a customer in, for example, a clothing store, a grocery store, a daily necessities store, or the like. In the present embodiment, an example in which settlement of a product is assisted in a clothing store will be described.

In the product settlement system 1, the shopping bag 10 is owned by the customer, and the customer visits a store in a state of carrying the shopping bag 10. On the other hand, the settlement assistance terminal 200 is owned by each store, is lent out to the customer (user) who visits the store in a state of being charged at each store, is used in a state of being electrically connected to the wire antenna 13 of the shopping bag 10 owned by the customer, and is returned from the customer to the store at the time of leaving the store.

The hardware configuration of the settlement assistance terminal 200 is as described above. The CPU 201 of the settlement assistance terminal 200 realizes functions of the control unit 211, a storage unit 212, a communication unit 213, a scanning unit 214, and the notification unit 206 by using each hardware by loading and executing the program stored in the ROM 202.

The CPU 201 functions as the control unit 211 in the settlement assistance terminal 200. The control unit 211 controls operations of other functional units. The ROM 202 and the RAM 203 function as the storage unit 212, and store various programs and data.

The communication unit 213 is connected to the user terminal 30 by a near field communication method such as BLE (IEEE 802.15.1 standard) or WiFi (IEEE 802.11 standard), and transmits and receives data and commands. The scanning unit 214 radiates radio waves from the wire antenna 13 at predetermined time intervals such as 0.1 seconds, for example, to collectively scan the RF tags present in the housing space S of the shopping bag 10. Note that, the shield layer 11D of the shopping bag 10 prevents the radio waves radiated from the wire antenna 13 from leaking to the outside, and also prevents the radio waves from the outside from being mixed to the housing space S. Accordingly, the scanning unit 214 can accurately detect the RF tags in the housing space S.

As will be described later, when the communication unit 213 receives information regarding payment of products put in the shopping bag 10 by communication with the user terminal 30, the notification unit 206 notifies the user and a store staff of a state of payment by performing display corresponding to the state of the payment. In addition, the notification unit 206 may be configured to perform notification about an operating state of the settlement assistance terminal 200 and an error such as low battery or connection failure in addition to the display regarding the state of the payment. In a case where the notification unit 206 includes the LED, for example, it is possible to easily grasp notification contents by setting a light emission color of the LED different for each of various kinds of notifications and payment statuses to be described later. In addition, for example, it is also possible to set the LED such that the light emission color corresponding to each notification is changed depending on the day.

The user terminal 30 is, for example, an information processing apparatus such as a smartphone, a tablet terminal, or a mobile phone owned by the customer who is the user. The user terminal 30 includes a control unit 31, an input unit 32, a storage unit 33, a communication unit 34, a display unit 35, and a scanning unit 36. Application software (hereinafter also simply referred to as an "application") operating on the user terminal 30 can execute a normal mode for assisting purchase through mail order (including E-commerce, online shopping, and the like) and a bag payment mode for assisting purchase using the product settlement system 1 in a real store by registering user identification information. In the normal mode, the product can be purchased via the Internet. On the other hand, in the bag payment mode, when the product is purchased in a real store, payment processing of the product can be performed by using the shopping bag 10, the settlement assistance terminal 200, and the application operating on the user terminal 30.

The control unit 31 includes a CPU (not shown) similarly to the settlement assistance terminal 200, and controls the units 32 to 36 and the like of the user terminal 30. In addition, the control unit 31 performs processing of switching between the normal mode and the bag payment mode, processing of a payment instruction for a purchased product in the bag payment mode, and the like for the above-described application operating on the user terminal 30.

The input unit 32 is, for example, a touch panel or an input button that receives an operation input from the user. The user inputs an instruction or the like by using the input unit 32, and thus, the user terminal 30 receives the instruction or the like from the user.

The storage unit 33 includes a flash memory and a RAM as a non-transitory storage medium, stores various programs used for controlling the user terminal 30, and stores various kinds of data. The communication unit 34 is connected to the settlement assistance terminal 200 by near field communication such as BLE, and transmits and receives data and commands.

The display unit 35 is, for example, a liquid crystal display panel, an organic EL display panel, or the like. The display unit 35 displays a predetermined screen under the control of the CPU. Note that, for example, the display unit 35 and the input unit 32 may have a structure in which the display unit 35 and the input unit 32 are integrated, for example, a touch panel of a capacitance type or a pressure sensing type is adopted and the display unit also functions as the input unit.

The scanning unit 36 is, for example, a camera included in the user terminal 30. The scanning unit 36 captures an image of a two-dimensional code such as a QR code (trademark) attached to the settlement assistance terminal 200, and extracts code information included in the two-dimensional code by interpreting the code according to a predetermined procedure. The two-dimensional code attached to the settlement assistance terminal 200 can include, for example, identification information (SSID and encryption key) for establishing near field communication connection with the settlement assistance terminal 200, identification information (individual identification number) of a battery included in the settlement assistance terminal 200, identification information (store identification number) of a store that manages the settlement assistance terminal 200, and the like.

The store server 40 includes a store information database (DB) 41 and a product information database 42. In addition, the store server includes hardware (not shown) such as a CPU, a ROM, and a RAM, manages the databases, and communicates with the user terminal 30 via the network 100.

The store information database 41 stores stock information of each product in each store, a floor map of each store, positional information of each product in each store, and the like. These pieces of information may be collectively retained in the store information database 41 of one store server 40, or separate servers may be constructed for each piece of stock information, floor map, and positional information of the product.

The product information database 42 stores detailed information of the product associated with the product identification information stored in the RF tag of each product. Such detailed information may include information such as product number, name, color, size, price, material, and country of manufacture of the product. Note that, the product information database 42 is not necessarily provided in the store server 40, and may be provided in another server connected to the store server 40 or the user terminal 30 via the network 100. In addition, each database of the store server 40 may be realized by disposing hardware in the vicinity of the store in order to increase responsiveness, may be realized by a virtual machine such as Amazon Web Services (AWS), or may be realized by a combination thereof.

<Processing of Product Settlement System>

Figure 5:
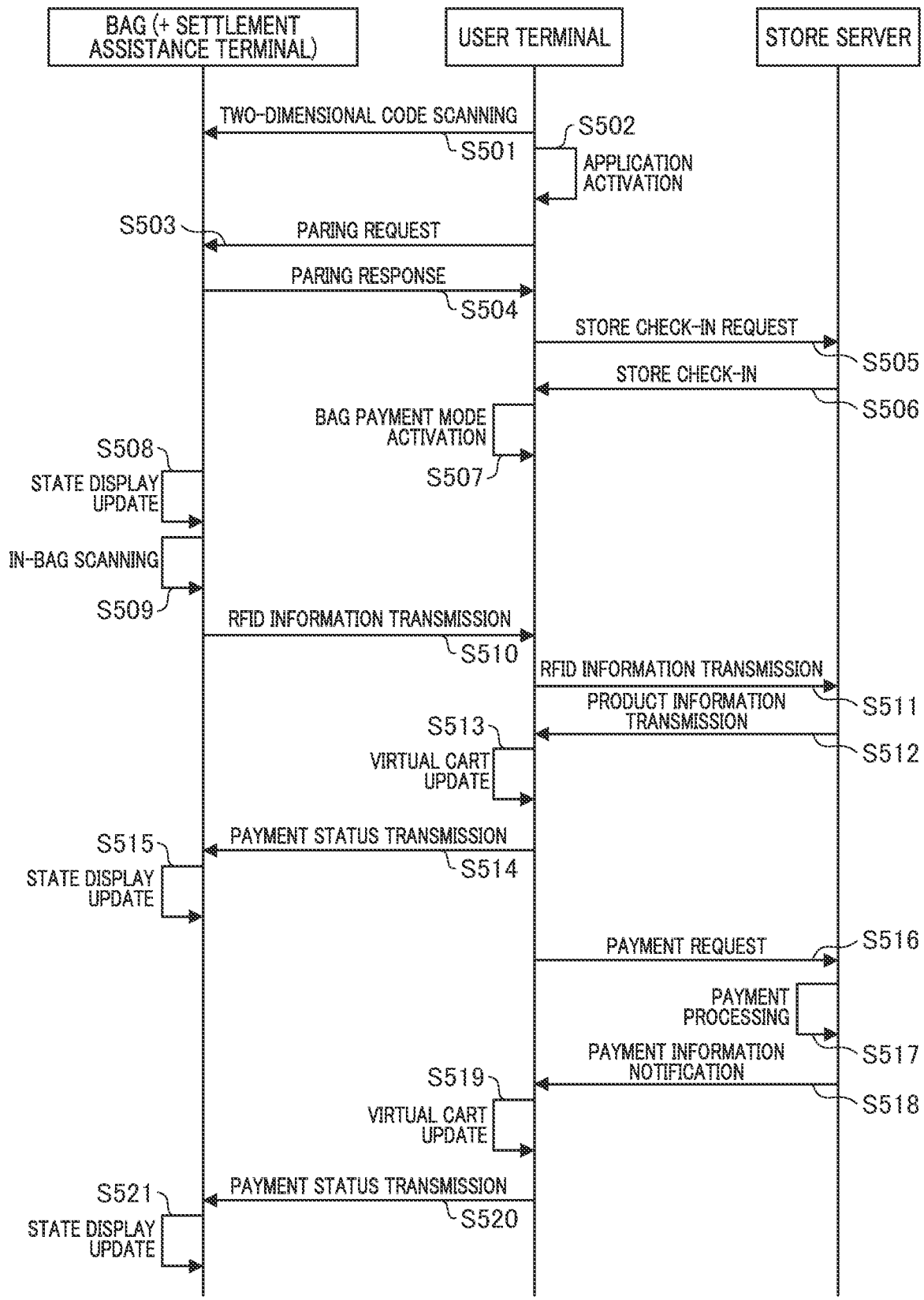
FIG. 5 is a sequence diagram of the operation procedure of the product settlement system.

FIG. 5 is a sequence diagram showing an example of an operation procedure of the product settlement system 1. Each operation (step) shown in the drawing is executed by control of each functional unit by the CPU of each of the settlement assistance terminal 200 connected to the shopping bag 10, the user terminal 30, and the store server 40.

As described above, the user who is the customer visits the store while carrying the shopping bag 10 and the user terminal 30. When the user enters the store or the like, the user receives the settlement assistance terminal 200 managed by the store, connects the antenna terminal 13A of the shopping bag 10 to the terminal 208 of the settlement assistance terminal 200, and accommodates the settlement assistance terminal 200 in the outer pocket 12 of the shopping bag 10. As a result, preparation for using the product settlement system 1 is completed.

First, in step 501 (shown as "S501". the same applies hereinafter), the user scans the two-dimensional code attached to the settlement assistance terminal 200 by using the scanning unit 36 of the user terminal 30. As described above, the two-dimensional code includes the identification information (SSID and encryption key) of the settlement assistance terminal 200 required for establishing the connection of the near field communication with the settlement assistance terminal 200, the identification information (individual identification number) of the battery of the settlement assistance terminal 200, the identification information (store identification number) of the store that manages the settlement assistance terminal 200, and the like. In addition, the two-dimensional code may include an activation command for the above-described application operating on the user terminal 30. In this case, the application is automatically activated by scanning the two-dimensional code by the scanning unit 36, or the screen of the user terminal 30 transitions to a screen prompting installation in a case where the application is not installed on the user terminal 30.

In step 502, the application is activated in the normal mode in the user terminal 30 automatically by scanning the two-dimensional code as described above or by receiving an application activation instruction from the user. Subsequently, in step 503, a pairing request is transmitted from the user terminal 30 to the settlement assistance terminal 200 by using the identification information included in the scanned two-dimensional code. In response, in step 504, a response indicating that the pairing is completed is returned from the settlement assistance terminal 200 to the user terminal 30. At the time of pairing, the connection of the near field communication is completed between the user terminal 30 and the settlement assistance terminal 200 by performing predetermined authentication processing and exchanging encryption information. In the case of BLE, the user terminal 30 operates as central, and the settlement assistance terminal 200 operates as peripheral. Specifically, with the connection of the settlement assistance terminal 200 to the antenna terminal 13A as a trigger, the settlement assistance terminal 200 as the peripheral periodically issues an advertisement packet for notifying surrounding BLE central of the presence of the settlement assistance terminal, for example, every 1 second. When the user terminal 30 scans the two-dimensional code, the user terminal acquires identification information (device name) of the settlement assistance terminal 200 embedded in the two-dimensional code, and acquires device names obtained by scanning the advertisement packet issued from the peripheral in parallel at the same time. The user terminal 30 issues a connection request to a peripheral having the device name that matches the device name obtained from the two-dimensional code among the device names obtained from the advertisement packet, and establishes connection with the settlement assistance terminal 200. In the case of BLE, the user terminal may present the device names obtained by scanning the advertisement packet to the user without scanning the two-dimensional code, and may issue the connection request by the user touching the device name to be connected.

Subsequently, in step 505, a store check-in request is transmitted from the user terminal 30 to the store server 40 by using the store identification information included in the two-dimensional code attached to the settlement assistance terminal 200. In step 506, the store server 40 confirms the received store identification information, and the store check-in is completed.

Note that, the store check-in may be performed in advance by using, for example, any one or a plurality of a beacon signal issued from a device installed in the store, a near field communication signal such as Bluetooth (trademark), positional information in the store, and scanning of another two-dimensional code set in the store.

After the completion of the store check-in, the control unit 31 of the user terminal 30 displays a screen (back payment mode selection screen) for selecting (enabling) the bag payment mode of the application on the display unit 35. When the user selects (enables) the bag payment mode, the bag payment mode is activated in the application in step 507.

Figure 6A:
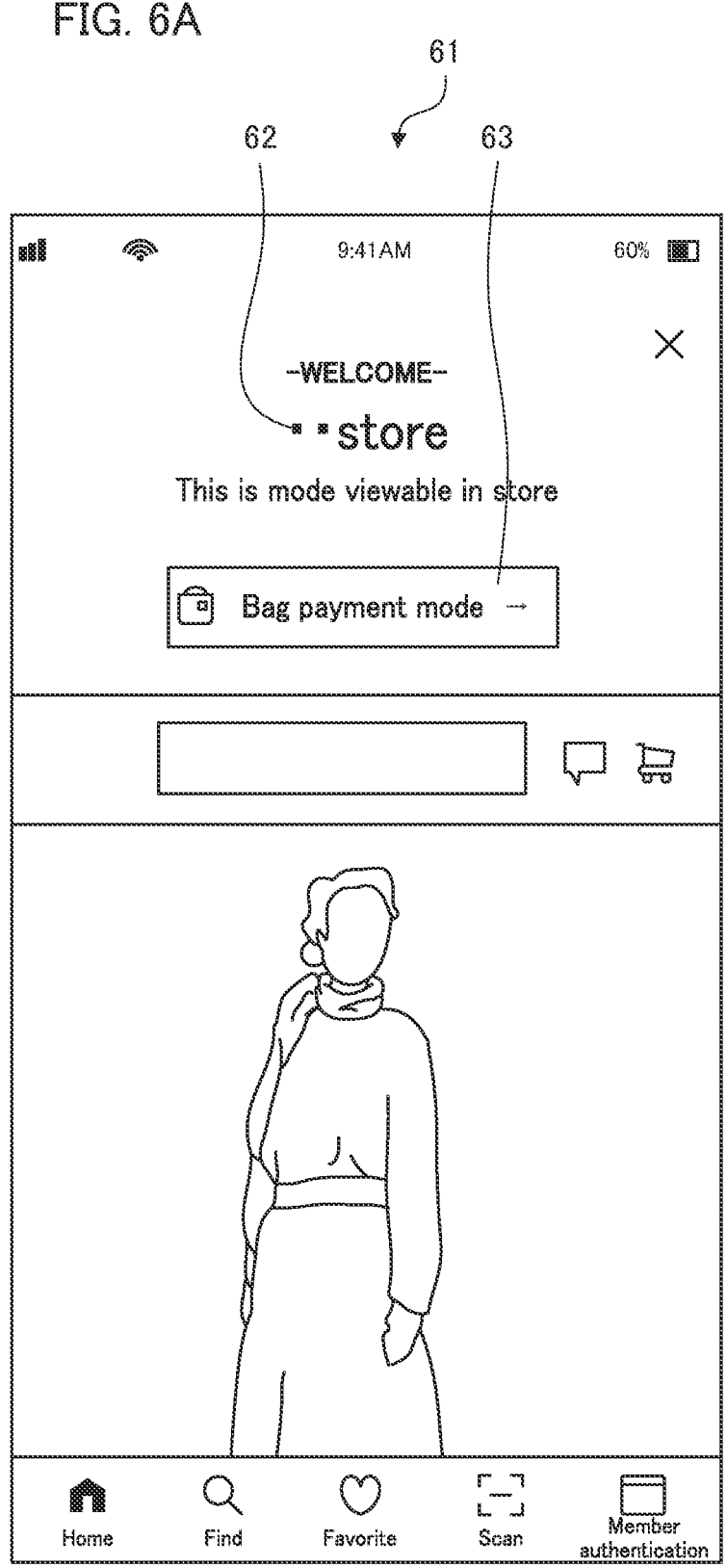
FIG. 6A is a diagram showing an example of a bag payment mode selection screen.
Figure 6B:
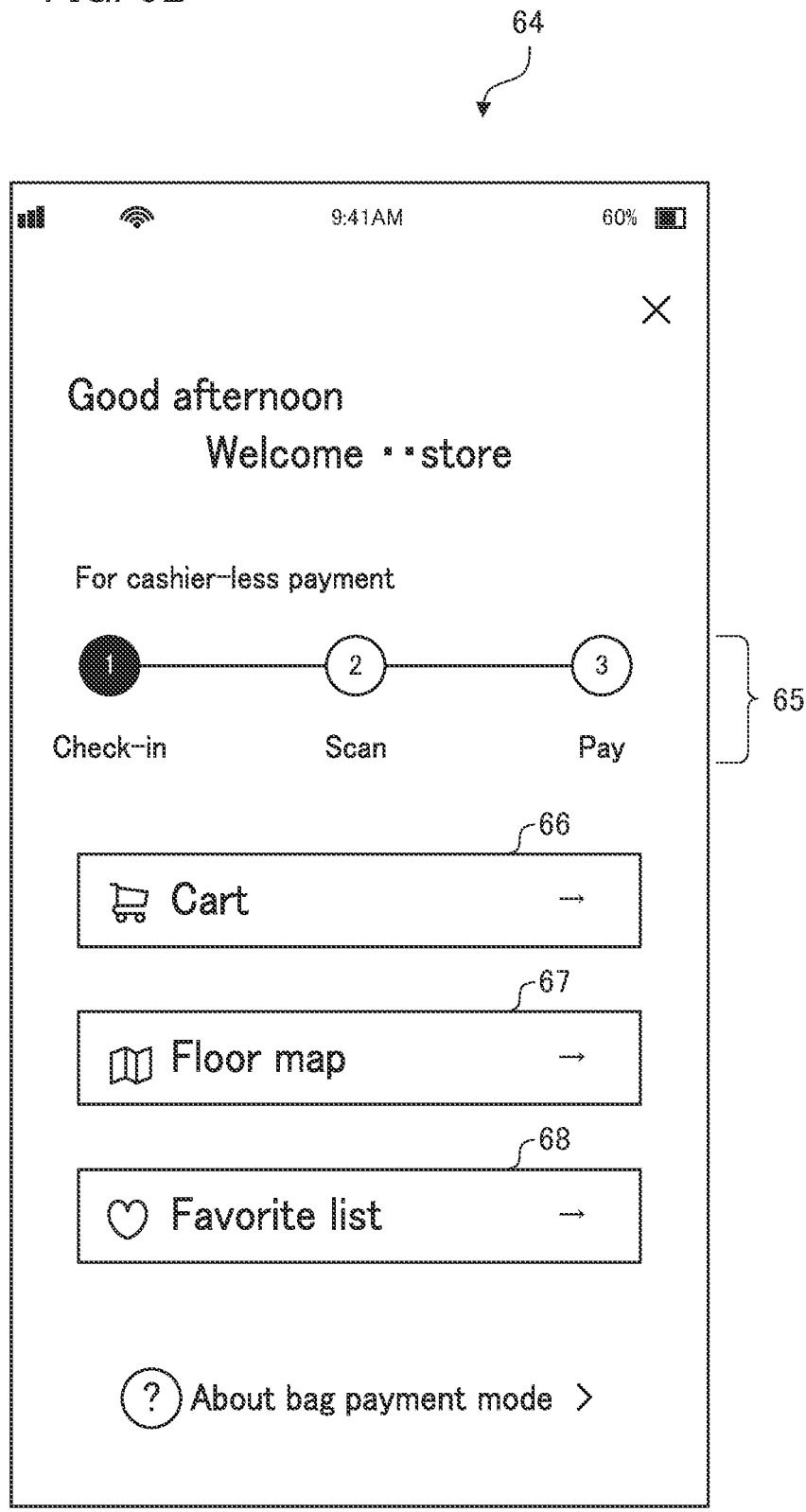
FIG. 6B is a diagram showing an example of a screen in the bag payment mode after the bag payment mode is activated.

FIGS. 6A and 6B are diagrams showing examples of display screens before and after the bag payment mode is activated. FIG. 6A is a diagram showing an example of a bag payment mode selection screen 61. A checked-in store name 62 and an icon 63 for selecting the bag payment mode are displayed on the bag payment mode selection screen 61.

FIG. 6B is a diagram showing an example of a screen in the bag payment mode after the bag payment mode is activated. When the bag payment mode is activated, a menu screen 64 of the bag payment mode is displayed. On the menu screen 64, a step display 65 is provided such that the user can easily grasp the processing in the bag payment mode.

In addition, the menu screen 64 includes, for example, a cart icon 66, a floor map icon 67, and a favorite list icon 68. When the user selects the cart icon 66 by tapping or the like, the screen transitions to a display screen of a virtual cart on which product information acquired by processing such as in-bag scanning to be described later is displayed. In addition, when the user selects the floor map icon 67, the user terminal 30 acquires a floor map of the check-in store from the store server 40, and transitions to a screen for displaying the acquired floor map. In addition, when the user selects the favorite list icon 68, the screen transitions to a screen for displaying a list of products (favorite products) registered in a favorite list in advance by the user.

After the bag payment mode is activated, state display by the notification unit 206 of the settlement assistance terminal 200 is updated in step 508. Here, state display indicating that the settlement assistance terminal 200 and the user terminal 30 are being paired (or the bag payment mode is in an activated state) and that any product is not put in the shopping bag 10 is performed. For example, this state display may be performed by the notification unit 206 emitting blue light.

Subsequently, in step 509, the scanning unit 214 of the settlement assistance terminal 200 radiates radio waves from the wire antenna 13 at predetermined time intervals such as 0.1 seconds, for example, to collectively scan the RF tags present in the housing space S of the shopping bag 10. As a result, in a case where the user puts a product to be purchased into the shopping bag 10, the RF tag of the product can be detected. When the settlement assistance terminal 200 and the user terminal 30 are being paired, the scanning unit 214 may continuously perform scanning.

When the RF tag of the product in the shopping bag 10 is detected in step 509, the product identification information (for example, an EPC of 24 digits in hexadecimal notation) scanned from the RF tag by the scanning unit 214 is transmitted to the user terminal 30 by the communication unit 213 in next step 510. When the user terminal 30 receives the product identification information, in step 511, the user terminal 30 transmits the received product identification information to the store server 40.

In step 512, the store server 40 that has received the product identification information from the user terminal 30 transmits the detailed information of the product associated with the received product identification information to the user terminal 30 while referring to the store information database 41 and the product information database 42. When the user terminal 30 receives the detailed information of the product, the content of the virtual cart is updated and the product is added to the virtual cart in step 513.

When the virtual cart is updated, payment status information for the products in the virtual cart is transmitted to the settlement assistance terminal 200 in subsequent step 514. The payment status information transmitted here indicates, for example, that at least a part of the products in the virtual cart is unpaid.

In step 515, the settlement assistance terminal 200 that has received the payment status information updates the state display by the notification unit 206. Here, state display indicating that an unpaid product is put in the shopping bag 10 is performed. For example, this state display may be performed by the notification unit 206 emitting red light.

Figure 7:
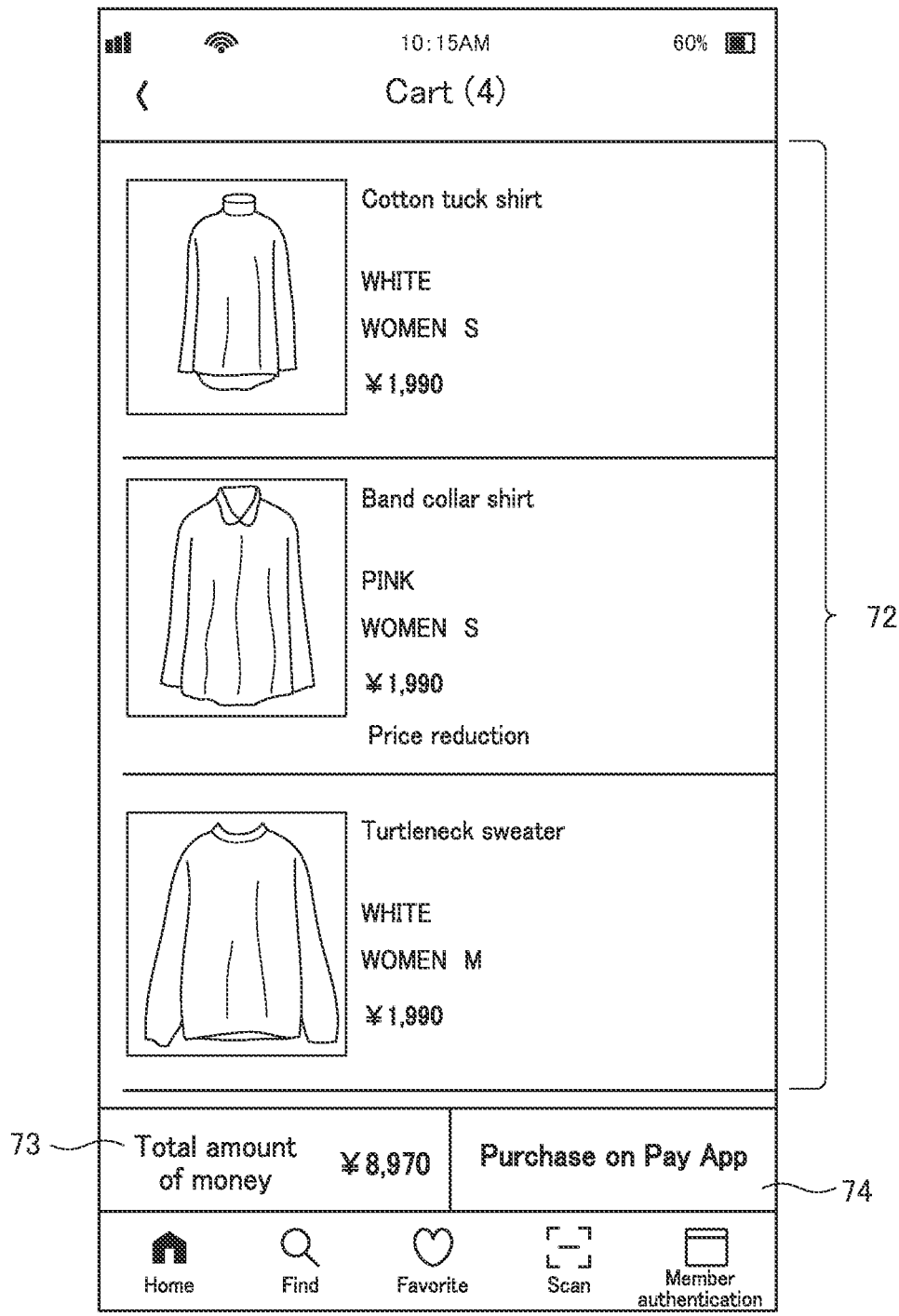
FIG. 7 is a screen displaying product information for products in a virtual cart.

FIG. 7 is a diagram showing an example of a screen for displaying detailed information of the product in the virtual cart. Product information 72 such as product name, color, size, price, and thumbnail image of the product in the virtual cart is displayed on a screen 71. In addition, a total amount of money 73 of the products in the virtual cart is displayed on the screen 71. Further, a payment icon 74 is displayed on the screen 71, and when the user selects the payment icon 74, payment processing to be described later can be executed.

After the virtual cart is updated in this manner and the state display corresponding the updated virtual cart is performed by the notification unit 206, the user can continuously consider whether or not to purchase another product. Until the user makes a payment request (step 516), the product settlement system 1 repeatedly executes a processing cycle from the in-bag scanning in step 509 to the state display update in step 515. Accordingly, when a product desired to be purchased is newly put in the shopping bag 10 by the user, the virtual cart and the state display by the notification unit 206 are updated at the time of executing a next processing cycle.

In addition, in a case where the user reconsiders and wants to cancel the purchase of the unpaid product put in the shopping bag 10 as the product to be purchased, the user can take out the product from the shopping bag 10 and return the product to a product shelf or the like in the store at any time. In such a case, when the in-bag scanning in step 509 is executed next, since the RF tag of the product is not detected, the product is removed from the virtual cart at the time of updating the virtual cart in step 513. At this time, when a product is added to the shopping bag 10, a first notification sound may be notified from the notification unit 206, and thus, the user may understand that the added product can be scanned. When a product is removed from the shopping bag 10, a second notification sound may be notified from the notification unit 206, and thus, the user may understand that the removed product cannot be scanned. With such a configuration, since it is not necessary to confirm whether or not scanning is successful each time by viewing the screen of the virtual cart, the convenience of the user is improved.

Subsequently, in step 516, the user selects the payment icon 74 on the screen 71, and thus, processing of the payment request for transmitting the payment instruction from the user terminal 30 to the store server 40 is performed. In the payment request, first, the user selects a payment method via the input unit 32. As the payment method, for example, it is possible to select credit payment, electronic money payment, instant withdrawal payment, point payment, and payment using predetermined application software also called smartphone payment. The smartphone payment may be incorporated as one function of application software related to purchase assistance in the user terminal 30. The user identification information required for payment may be registered in the application by the user in advance, or may be registered on the spot by requesting the user to register when the payment icon 74 is selected.

After the payment method is selected, the control unit 31 transmits a payment execution instruction and necessary payment information (each product identification information, total amount of money, user identification information, and the like) to the store server 40. When the store server 40 receives the payment request, in subsequent step 517, the store server 40 transmits necessary payment information to an external electronic payment server (not shown) and requests payment processing. In the payment server, credit payment information and electronic money information are registered in advance in association with the user identification information, and the payment processing is executed based on these pieces of information and the payment information received from the store server 40.

The store server 40 determines whether or not the payment is normally completed based on a response from the payment server, notifies the user terminal 30 of a payment error in a case where the payment is not normally completed, displays an error or the like on the user terminal 30, and executes the payment processing again. In a case where the payment is normally completed, the store server 40 registers the identification information of the product for which the payment is completed in association with the user identification information, and notifies the user terminal 30 of the identification information of the product for which the payment is completed in step 518.

Subsequently, in step 519, the control unit 31 of the user terminal 30 updates the virtual cart, and assigns an attribute of "paid" to the product for which payment is completed. On a display screen of the user terminal 30, display indicating that the payment has been completed may be added to the product information 72 in the virtual cart, or the product for which the payment has been completed may be moved from the virtual cart to another list such as a list of products for which the payment has been completed. In addition, the payment information including the pieces of identification information of all the products for which the payment has been completed, a payment completion time, and the like, which is recorded in the store server 40 may be displayed on the display unit 35 of the user terminal 30 in accordance with a request of the store staff, for example, at the time of leaving the store. As described above, since the payment processing of the product can be completed based on the payment instruction from the user terminal 30 owned by the user, the user does not need to line up at an accounting machine in the store, and a time required for accounting can be shortened. In addition, since it is not necessary to take time or effort to repack the accounted product in another shopping bag, the convenience of the user is improved.

Upon the completion of the payment of the product, in subsequent step 520, the payment status information about the product in the virtual cart after the payment is transmitted to the settlement assistance terminal 200. The payment status information transmitted here can be, for example, information indicating that all the products in the virtual cart have been paid for.

The settlement assistance terminal 200 that has received the payment status information updates the state display by the notification unit 206 in next step 521. Here, state display indicating that all the products in the shopping bag 10 have been paid for is performed. For example, this state display may be performed by the notification unit 206 emitting green light.

Figure 8:
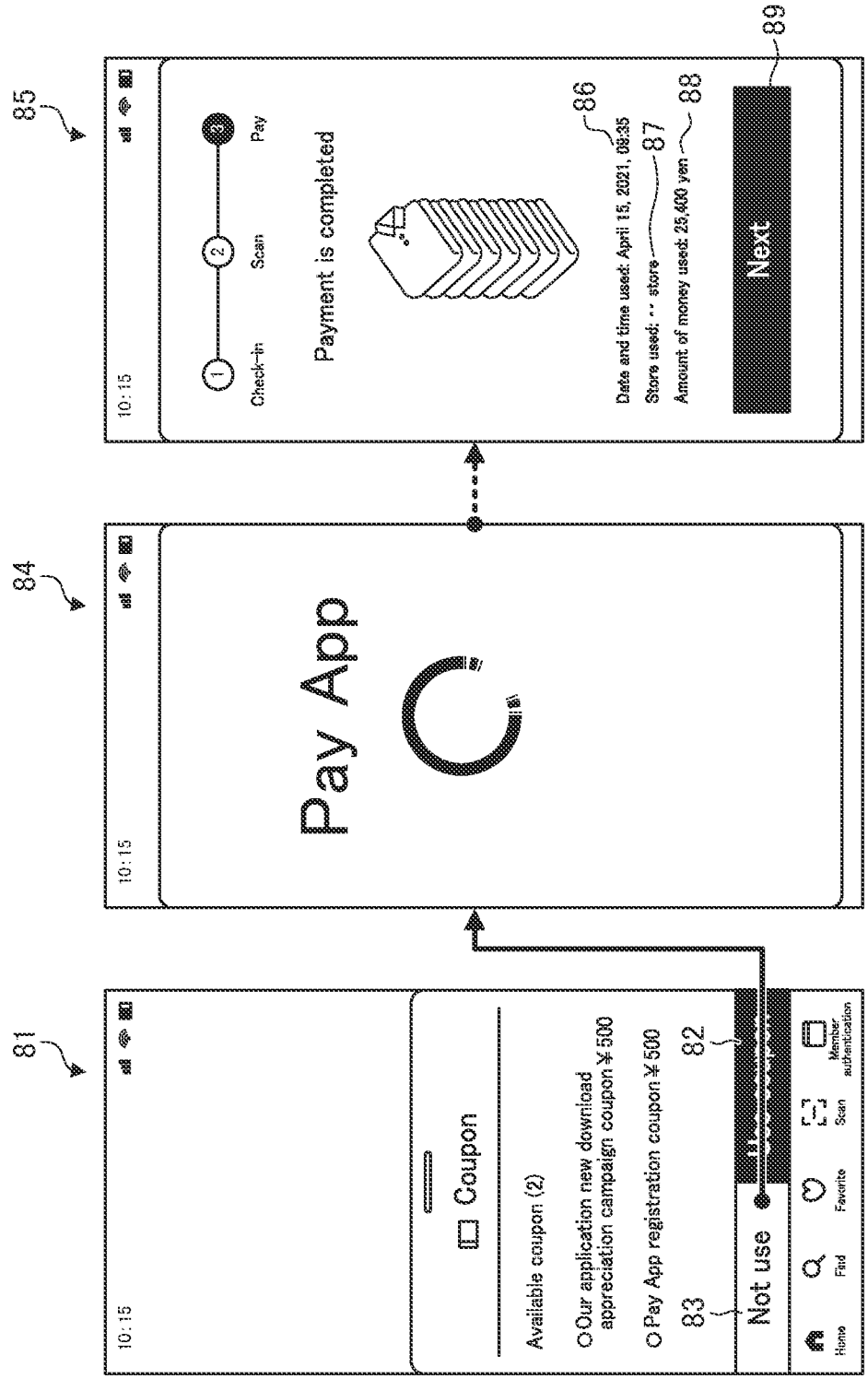
FIG. 8 is a display screen at the time of payment.

FIG. 8 is a diagram showing an example of a display screen on the user terminal 30 at the time of payment. A display screen 81 is displayed, for example, by selecting the payment icon 74 shown in FIG. 7. The display screen 81 is a display screen when the payment processing is started, and may display currently available coupon information. The user selects a coupon to use, and selects an icon 82 for performing payment by using the coupon. Thus, the user can perform payment by using the coupon. On the other hand, in a case where the user does not use the coupon, the user can perform payment without using the coupon by selecting an icon 83 for performing payment without using the coupon. The user selects the icon 82 or the icon 83, and thus, a payment screen 84 is displayed. Accordingly, the payment is executed.

When the payment is normally completed, a payment completion screen 85 is displayed, and the user can confirm that the payment is normally completed. For example, a date and time 86 when the payment is completed (date and time used), a store name 87 of the store where the product is purchased (store used), and a total amount of money 88 of the purchased products (amount of money used) are displayed on the payment completion screen 85. Then, the user selects an icon 89 for proceeding to next processing, and thus, the screen transitions to a screen of FIG. 9.

Figure 9:
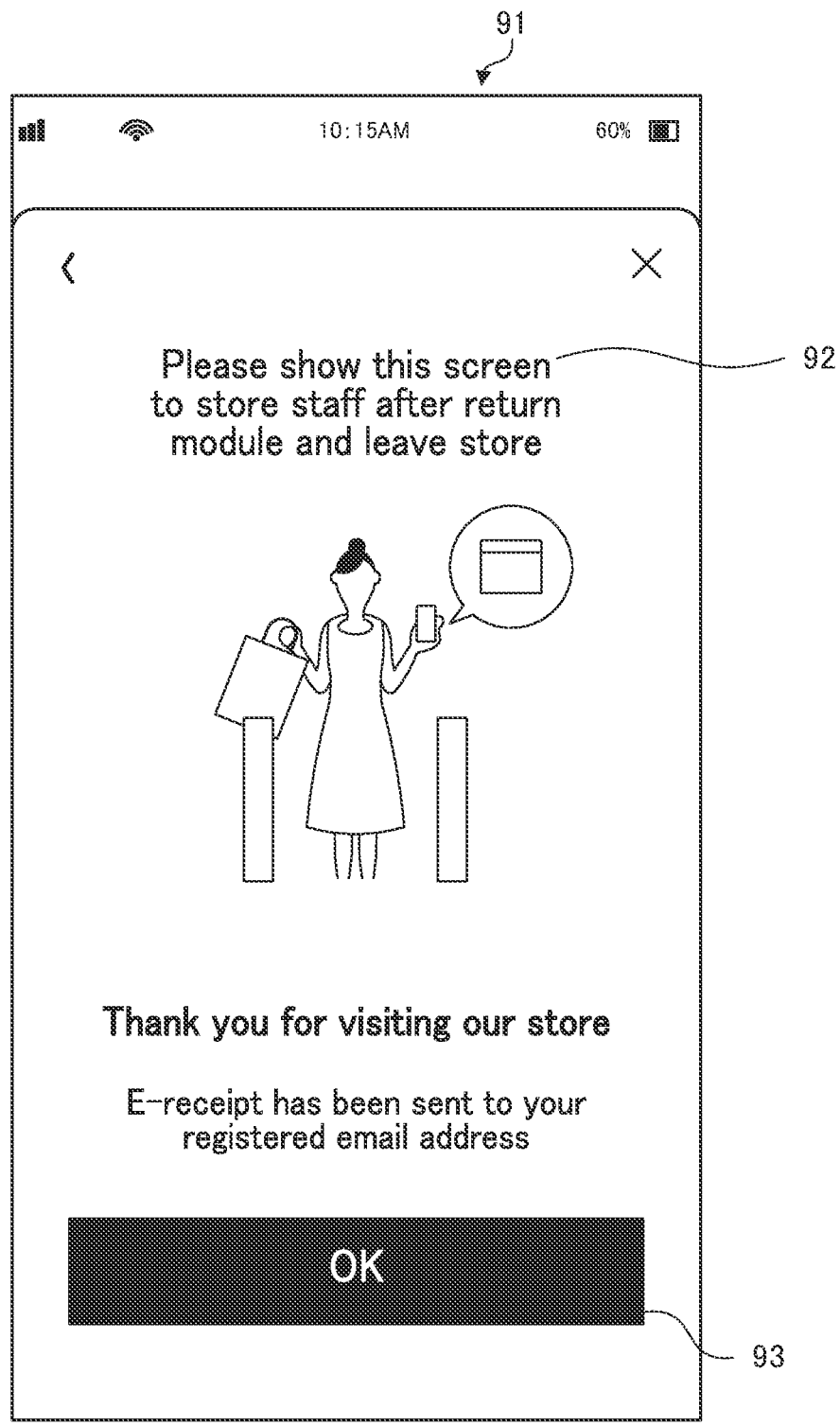
FIG. 9 is a display screen after payment is completed.

FIG. 9 is a diagram showing an example of a display screen after the completion of the payment. A guide 92 (description) for a store leaving procedure is displayed on a display screen 91. As shown in the guide 92, the user shows the display screen 91 to the store staff standing by near an exit after returning the module (settlement assistance terminal 200) at a predetermined place, indicates that the payment of the products in the shopping bag 10 is completed, and then leaves the store.

Note that, in order to prevent take-out due to forgetting to return the settlement assistance terminal 200, an RFID security gate capable of detecting the settlement assistance terminal 200 may be installed at a store exit, and the settlement assistance terminal 200 may be notified by sound or the like from the security gate when the settlement assistance terminal 200 to which the RFID is attached in advance passes through the gate. In addition, as another example, a store exit gate linked to a collection facility of the settlement assistance terminal 200 is installed, the gate is opened by returning the settlement assistance terminal 200 to the collection facility, and the user can leave the store.

In addition, the user can newly purchase another product after the completion of the payment. When the user selects an icon 93 for accepting the confirmation of the guide 92 on the display screen 91, the screen transitions to the menu screen 64 shown in FIG. 6B again. Here, when a new product is put in the shopping bag 10, the RF tag of the product is detected when the in-bag scanning in step 509 is performed again, and the update of the virtual cart (step 513) and the update of the state display by the notification unit 206 (step 515) are performed by the subsequent processing.

In response, the user can execute the payment request processing in and after step 516 again.

As described above in detail, in the shopping bag 10 of the present embodiment, since the perimeter wall 11 constituting the housing space S includes the shield layer 11D having the radio wave shielding function, and the wire antenna 13 for scanning the product identification information from the RF tag of the product, the product identification information regarding the product accommodated in the housing space S of the shopping bag 10 can be collected with high accuracy by using the settlement assistance terminal 200 externally connectable to the wire antenna 13. Accordingly, it is not necessary for the user, the store staff, or the like to manually scan the product code such as a barcode, and a time required for accounting processing can be shortened.

In addition, since the product identification information can be acquired in a state where the product is put in the shopping bag 10 that is the user's belongings, it is not necessary to transfer the purchased product by the hand of the user or the store staff to a basket or a bag for take-out by performing the payment processing based on the acquired product identification information, and the product can be taken home as it is. As a result, the user can leave the store quickly after accounting, and the convenience of shopping at the store can be improved.

Further, in the present embodiment, the shopping bag 10 is used in a state of being connected to the settlement assistance terminal 200. The settlement assistance terminal 200 acquires the product identification information from the product put in the shopping bag 10 by being detachably connected to the wire antenna 13, and transmits the acquired product identification information to the user terminal 30 owned by the customer. As a result, since the product identification information can be acquired only by putting the product in the shopping bag 10, it is not necessary for the user, the store staff, or the like to manually scan the product code such as the barcode, and the time required for the accounting processing can be shortened. In addition, since the identification information of the product put in the shopping bag 10 is transmitted to the user terminal 30 in substantially real time, it is not necessary for the user to perform a work of collectively transmitting the product information at a predetermined position such as an accounting lane as in the technology of JP 2019-215719 A. Accordingly, the user can perform the payment request and advance the payment processing at any place in the store at any timing based on the transmitted product identification information.

In addition, in the present embodiment, the settlement assistance terminal 200 is lent out to the user when the user enters the store or the like, and is used in a state of being connected to the shopping bag 10 owned by the user. Since the settlement assistance terminal 200 is detachable from the shopping bag 10 and is stored in the store, the body of the shopping bag 10 can have a simple configuration in which an expensive electronic component or the like is not incorporated. As a result, the cost of the body of the shopping bag 10 can be reduced. In addition, since the settlement assistance terminal 200 is charged and stored in the store at the time of non-use, it is possible to minimize the occurrence of troubles such as runout or failure of the charge while being lent out to the user and used.

Further, in the present embodiment, the settlement assistance terminal 200 acquires the information regarding the product put in the shopping bag 10, in particular, the information regarding the payment of the product by the communication with the user terminal 30, and the notification unit 206 performs the display corresponding to the state of the payment. Thus, it is possible to know the presence or absence of the unpaid product in the shopping bag 10, the presence or absence of the paid product, and the like by viewing the display of the notification unit 206. In particular, since the settlement assistance terminal 200 is accommodated in the transparent outer pocket 12 of the shopping bag 10, the display by the notification unit 206 can be easily visually recognized from the outside. Accordingly, the customer or the store staff confirms the display, and thus, it is possible to prompt the customer to perform payment or to use the display for preventing a crime such as shoplifting. In the technology of JP 2019-215719 A, the user terminal and the settlement assistance terminal cannot cooperate while using the shopping bag (while the settlement assistance terminal is accommodated in the inner pocket).

Further, in the product settlement system 1 of the present embodiment, the product identification information of the product in the housing space S acquired by the settlement assistance terminal 200 connected to the wire antenna 13 of the shopping bag 10 is acquired by the user terminal 30, and is transmitted to the store server 40. The store server 40 transmits the product information associated with the received product identification information to the user terminal 30, and the user terminal 30 can give an instruction about the execution of the payment processing of the product in the user terminal based on the received product information and the user identification information registered by the user. Accordingly, it is possible to acquire the information of the product without requiring a work of scanning the product code by the hand. In addition, since the user terminal 30 can perform accounting to payment in a state where the product is put in the shopping bag 10, it is possible to take out the product home as it is without performing a transfer work to another shopping bag or bag.

Note that, in the above-described embodiment, although the example in which the settlement assistance terminal 200 is attached to and detached from the shopping bag 10 has been described, in a case where the cost of each component of the settlement assistance terminal 200 does not become a problem, the settlement assistance terminal may not be detachable. On the other hand, a part of the functions of the settlement assistance terminal 200, which is detachable, may be disposed on the shopping bag 10 side. For example, the notification unit may be disposed on the shopping bag 10 side. In that case, the antenna terminal 13A needs to be able to electrically join other wirings such as a control line of the notification unit in addition to an antenna line. In addition, the control unit 211 may transmit information to perform display similar to the display of the above-described notification unit 206 on the display unit 35 of the user terminal, and may cause the display unit 35 to function as the notification unit.

In addition, in the above-described embodiment, the settlement assistance terminal 200 is accommodated in the transparent outer pocket 12 of the shopping bag 10, but may be accommodated in an inner pocket disposed inside the shopping bag 10 instead of the outer pocket. In this case, it is not necessary to draw out the wiring from the wire antenna to the antenna terminal 13A of the inner pocket through the insulating layer 11C, the shield layer 11D, and the surface layer 11E. However, since the display of the notification unit disposed in the inner pocket cannot be visually recognized from the outside, it is preferable that the notification unit is provided on the bag body side or a part of each layer of the bag 10 is formed as a transmissive member. In addition, it is preferable that the inner pocket is provided at an upper end of the perimeter wall so as to be able to be paired with the user terminal.

In addition, the disposition of the antennas may be set to be different depending on the shape of the shopping bag. For example, when a depth d of the bag bottom surface is about 20 cm, the wire antenna may be disposed only on one side of the perimeter wall to suppress the cost of the antenna. However, in a case where the depth d of the bottom surface exceeds 20 cm, it is preferable that the wire antenna is disposed on at least one of the bottom surface and the other side of the perimeter wall.

In addition, although not described in detail in the above-described embodiment, the null point is generally known as a point at which cancellation of a direct wave by a reflected wave occurs and a scanning is not possible. A general solution to the null point is to dispose a plurality of radio wave radiation sources. However, depending on a package of the product to be scanned, the radiated radio waves are shielded, irregularly reflected, absorbed, and the like, and thus, there is a possibility that an unexpected null point occurs. Therefore, it is preferable that coil antennas are disposed in a grid pattern, for example, such as radio waves are radiated from the entire perimeter wall. However, when the antennas are disposed in such a manner, in a case where the cost increases or the bag 10 is deformed, there is a possibility that the antenna is damaged, and thus, it is preferable that the wire antenna is disposed. In addition, in a case where the wire antenna is disposed, it is preferable that the wire antenna is disposed along the perimeter wall over w/2 or more in the width direction, and it is preferable that the wire antenna is disposed over 2 h/3 or more from the bottom surface portion in a height direction.

In addition, in the above-described embodiment, the perimeter wall and the bottom surface portion of the shopping bag suppress the radio waves in a horizontal direction and a lower direction. However, when it is necessary to suppress the leakage of the radio waves in an upper direction in a case where a ceiling of a use environment is low or the like, an inner purse-string having a radio wave shielding function or a member (a fastener, a snap button, or the like) for locking an upper portion of the facing surface of the perimeter wall may be disposed. Assuming that the user leaves the store and then take out the product home as it is, when the product is put in a bicycle basket or is placed on a seat of a train or a vehicle, since there is a possibility that the shape of the bag collapses and the product protrudes from an upper side of the bag, it is also preferable that the shopping bag is formed as described above from the viewpoint of suppressing such protrusion of the product.

In the above-described embodiment, it is assumed that the perimeter wall of the shopping bag is flexible like a plain shopping bag not having a RFID scanning function or the like, but a sturdy configuration such as a shopping basket or carrier may be used. There is an advantage that the flexible perimeter wall is easier to carry (especially in a case where there are few products to be accommodated), and the sturdy perimeter wall is easier to protect the products to be accommodated.

Note that, the above-described embodiment is an example for describing the present invention, and is not intended to limit the present invention only to the embodiment. The present invention can be implemented in various forms without departing from the gist thereof. In a case where the kinds of processing in the settlement assistance terminal 200, the user terminal 30, and the store server 40 are realized by a computer, the processing content of the function of each unit of these devices is executed based on the program. The program describing the above-mentioned processing content can be recorded on a computer-readable recording medium. The computer-readable recording medium may be, for example, a magnetic recording device, an optical disc, a magneto-optic recording medium, a semiconductor memory, or the like. In addition, the processing of each unit may be configured by executing a predetermined program on the computer.

The embodiment can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a non-transitory computer readable program recorded on a memory device to perform the functions of the above-described embodiment (s). For this purpose, the program is provided to the computer for example via a network or from a recording medium of various types serving as the memory device (e.g., computer-readable medium).

What is claimed is:

1. A shopping bag with a settlement assistance terminal and a housing space that can accommodate products by a perimeter wall having a layered structure, wherein
the perimeter wall includes at least a shield layer having a radio wave shielding function, and an antenna layer disposed inside the shield layer, a wire antenna for scanning product identification information from an RF tag attached to a product accommodated in the housing space being stretched along the perimeter wall in the antenna layer, wherein
the settlement assistance terminal is detachably connected to the wire antenna, and is configured to acquire the product identification information from the product accommodated in the housing space via the wire antenna, communicate with a user terminal owned by a customer, and transmit the acquired product identification information to the user terminal,
the settlement assistance terminal includes a notification unit for displaying information regarding payment of the product accommodated in the housing space of the shopping bag,
the perimeter wall further comprising an outer pocket for accommodating the settlement assistance terminal on a surface layer which is an outermost layer of the perimeter wall, and
the outer pocket is configured to visually recognize the display by the notification unit of the accommodated settlement assistance terminal from an outside of the outer pocket.

2. The shopping bag according to claim 1, wherein the wire antenna is disposed along the perimeter wall with a length of at least three times or more of a width w of the shopping bag.

3. The shopping bag according to claim 2, wherein a shape of the wire antenna is at least one of a meander shape, a spiral shape, and a mesh shape.

4. The shopping bag according to claim 3, wherein an antenna having a coaxial cable shape is used as the wire antenna.

5. The shopping bag according to claim 1, further comprising: a non-metallic protective layer on a further inner side of the antenna layer.

6. The shopping bag according to claim 1, wherein
the notification unit is configured to acquire the information regarding the payment of the product accommodated in the housing space by communication with the user terminal, and perform display corresponding to a state of the payment by the notification unit.

7. The shopping bag according to claim 1, wherein the outer pocket is made of a transparent material.

8. A product settlement system, comprising:
a shopping bag with a housing space that can accommodate products by a perimeter wall having a layered structure, the perimeter wall including at least a shield layer made of a material having a radio wave shielding function and an antenna layer disposed inside the shield layer, a wire antenna for scanning product identification information from an RF tag attached to a product accommodated in the housing space being provided in the antenna layer;
a settlement assistance terminal that is detachably connected to the wire antenna, and is configured to acquire the product identification information from the product accommodated in the housing space via the wire antenna;
a store server configured to manage store information regarding a store that sales products and product information regarding an individual product; and
a user terminal that is owned by a customer, and has user identification information of the customer, the user terminal being connected to be able communicate with the settlement assistance terminal and the store server, and being configured to acquire the product identification information from the settlement assistance terminal, acquire the product information associated with the acquired product identification information from the store server, and give an instruction about execution of payment processing of the product based on the acquired product information and user identification information.

9. The product settlement system according to claim 8, wherein
the settlement assistance terminal
includes a notification unit for displaying information regarding payment of the product accommodated in the housing space of the shopping bag, and is configured to
acquire information regarding the payment of the product accommodated in the housing space by communication with the user terminal, and
perform display corresponding to a state of the payment by the notification unit.

10. The product settlement system according to claim 8, wherein a notification unit of the settlement assistance terminal notifies the customer of status information indicating at least one of statuses "the shopping bag is empty", "the shopping bag contains unpaid items", or "error".

11. The product settlement system according to claim 8, wherein a notification unit of the settlement assistance terminal notifies the customer of a low battery state of the settlement assistance terminal.

12. A product payment method using a shopping bag with a housing space that can accommodate products by a perimeter wall having a layered structure, the perimeter wall including at least a shield layer made of a material having a radio wave shielding function and a wire antenna disposed inside the shield layer, the wire antenna being configured to scan product identification information from an RF tag attached to a product accommodated in the housing space, a settlement assistance terminal configured to acquire the product identification information from the product accommodated in the housing space via the wire antenna, and a store server configured to manage product information regarding an individual product, the method comprising:
establishing connection between a user terminal of a customer and the settlement assistance terminal;
acquiring, by the user terminal, the product identification information acquired from the RF tag of the product accommodated in the housing space by the settlement assistance terminal;
receiving, by the user terminal, the product information associated with the acquired product identification information from the store server; and
giving, by the user terminal, an instruction about execution of payment processing based on the product information acquired in the receiving the product information.

13. A computer-readable program stored in a non-transitory storage medium of a user terminal that causes the user terminal to implement the product payment method according to claim 12.

* * * * *